Patented June 20, 1950

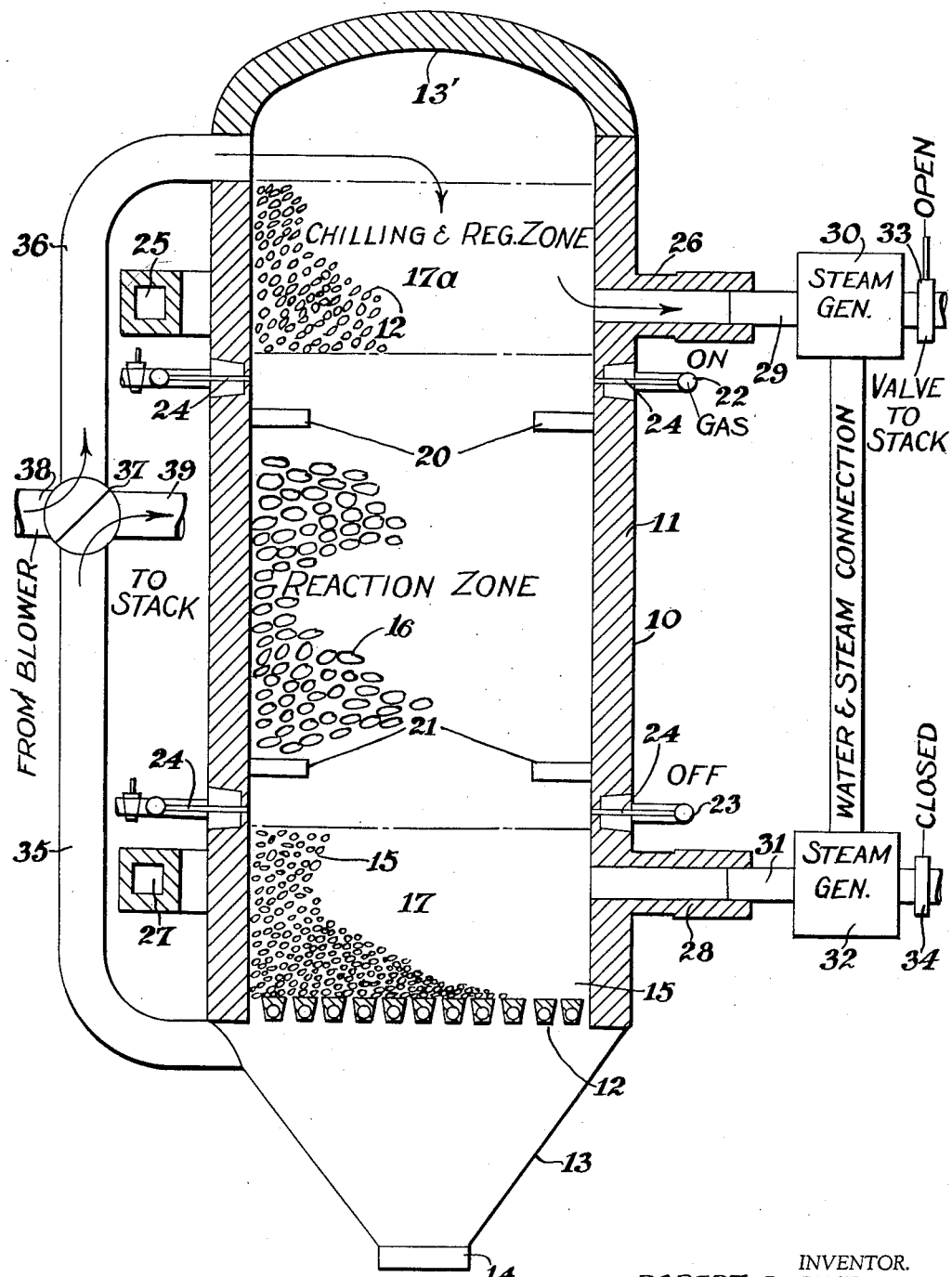

2,512,259

UNITED STATES PATENT OFFICE 2,512,259

FURNACE FOR THE PRODUCTION OF NITRIC OXIDE FROM AIR

Robert D. Pike, Pittsburgh, Pa.

Application April 9, 1943, Serial No. 482,426

2 Claims. (Cl. 23—277)

The present invention, relating as indicated to a furnace, is more particularly directed to the method and apparatus for carrying out gaseous reactions at high temperatures, and particularly for the fixing of the nitrogen of the air in nitric oxide, and represents an improvement on my copending application, Serial No. 484,815, filed April 28, 1943 entitled "Furnace," now abandoned.

In the invention of my copending application, above referred to, which also relates to the method of carrying out a gaseous reaction at high temperatures and to a furnace therefor, certain very definite advantages are obtained, but in the apparatus as there described and explained, these advantages are secured through the use of twin interconnected furnaces, operated alternately to carry out the desired reaction. The particular advantages referred to in the invention of my copending application are the immensely rapid cooling rate which is secured of the products of combustion, which are at an extremely high temperature, and the shielding of the otherwise exposed portions of the furnace from that high temperature. The present furnace is adapted to retain and to improve upon the effectiveness of these two features of the invention of the preceding application.

To the accomplishment of the foregoing and related ends, said invention, then, consists of the means hereinafter fully described and particually pointed out in the claims; the annexed drawing and the following description setting forth in detail certain means and one mode of carrying out the invention, such disclosed means and mode illustrating, however, but one of various ways in which the principle of the invention may be used.

In the single figure appearing in said annexed drawing, is a central vertical section, more or less diagrammatic, of my improved furnace, together with the fluid connections.

Referring to the drawing, there is shown a furnace chamber 10 of substantially cylindrical cross-section and elongated form disposed in a vertical position and lined with suitable refractory material 11. The bottom end of the chamber is normally closed with a cover 14 at the lower end of the conical end portion 13 which extends below a grate member 12 extending across the bottom of the cylindrical portion of the furnace proper. At the upper end the furnace is provided with an arched roof 13' which, together with the closed conical bottom portion 13, and the cylindrical section of the furnace constitute the entire closed furnace chamber, except, of course, for the connections and flues hereinafter to be described.

Within the furnace chamber proper and resting upon the grate 12 is a mass of refractory fragments or pebbles 15, which constitute a regenerative bed 17, often termed or known as a Royster bed. The pebbles are of some highly refractory material, such as fused periclase. On top of the Royster bed 17 and occupying the central portion of the cylindrical chamber is a second bed 16 known as the reaction zone of the furnace and this bed is preferably deeper than the regenerative bed 17. It is also composed of fragments or pebbles of fused periclase but these are of a larger size than those in the regenerative bed at the bottom of the furnace. On top of the reaction zone and completing the filling of the entire furnace volume up to the space directly beneath the roof is a second regenerative bed 17a of the same character as the bed 17. The size of pebbles ordinarily employed in the regenerative zones are of 1–1½" maximum size, which should be uniformly graded. In the intermediate reaction zone larger fragments, graded from 3 to 6" in size, are employed.

Circular manifolds 22 and 23, carrying gaseous fuel, which is preferably natural gas, are disposed around the furnace chamber at points spaced from either end at the approximate positions shown, which are approximately the top and bottom of the reaction zone 16. These manifolds are connected with a number of water-cooled nozzles 24 which introduce gas into the furnace at a multiplicity of points. These should, of course, be equally spaced and are on the upper and lower sides in the furnace of deflecting baffles 20 and 21, which project into the beds from the wall of the furnace and serve to direct the flow of gases centrally through the beds and away from the furnace wall. One or the other of the manifolds 22 and 23 is employed to supply gas to the furnace while the other is shut off in the manner which will presently be described.

In the upper extremity of the regenerative bed 17a, I dispose a refractory lined circular flue or bustle pipe 25 having a connection to the interior of the furnace through a number of flues 26, and a similar bustle pipe 27 with connecting flues 28 is placed at the top of the regenerative bed 17. The bustle pipe 25 is preferably connected through another flue 29 to a steam generator 30 and the bustle pipe 27 is similarly connected through a conduit 31 to a second steam generator 32 so that hot gases from the furnace may be utilized to generate steam as a by-product of the operation of the apparatus and method. The two steam generators may have common water and steam chambers but their gas chambers are separate so that during different phases of operation of the apparatus, hot gases from different parts of the furnace may be utilized for heating the same water and steam chambers although the hot gases pass through separate chambers in effecting heat transfer to the water. Each has a stack control valve 33, 34 which operates in step with the reversals of the furnace so that gas is flowing either through the generator 30 or the generator 32, but never through both at the same time.

The flues 35 and 36, which are connected to the top and bottom of the furnace at points respectively above and below the combined regenerative and reaction zones, extend to two common conduits 38 and 39, of which the conduit 38 is connected to a blower and the conduit 39 to the stack. A valve 37 controls the flow from the blower through the conduit 36, for example, and then down through the furnace chamber while gas containing the products of combustion is passing through the flue 35 and into the stack, or this direction of flow may be reversed by movement of the valve. The products of combustion which pass up through the pipe 39 may, of course, go to further equipment, which is not shown, for further treatment for recovery of their content of nitric oxide, or other valuable constituent.

The apparatus diagrammatically shown may be variably used, but for example, may be employed as follows in the manufacture of nitric oxide. Certain assumptions may there be made; an internal diameter within the refractory lining of the furnace of 14′6″ and regenerative beds of 7′ depth and reaction bed of 15′ depth; then on down-stream operation the blower furnishes to flue 36 an amount of slightly preheated air that corresponds to about 96,000 standard cubic feet per minute (calculated as air at 60° F. and 30″ of mercury), the actual pressure being about 7 pounds per square inch. This air passes down through the bed 17a (being heated to a mean temperature of about 3400° F.) by preceding cycles of operation which will be apparent hereinafter; of the total amount of air introduced into the furnace chamber about 18,000 standard cubic feet per minute are withdrawn through the connection 26 into the bustle pipe 25 and then through the conduit 29 into the steam generator 30 and to the stack through the valve 33. On the foregoing assumptions as to furnace sizes and volumes of air passed through with, of course, suitable amounts of gas which are specified below, approximately 40 tons of fixed nitrogen can be made per day of twenty-four hours. The gas of combustion passing to the recovery system will contain about 2% nitric oxide by volume dry basis.

The hot air carried out into the steam generators is capable of generating steam in considerable quantities, and the air thus used for generation of steam passes up the stack. An advantage of this arrangement is that valves 33 and 34 which control the flow through steam generators and therefore from the regenerator beds operate on relatively cold air and are therefore easy to maintain.

The air remaining in the furnace chamber passes down through the reaction bed 16 and meets a number of jets of gas injected through the nozzles 24 supplied from the manifold 22 which in the cycle of the operation here described is connected to the gas supply while the manifold 23 is shut off and the valve 34 is closed. As the gas meets the air at a mean temperature of about 3400° F. combustion takes place, increasing the temperature to 4300° F., causing expansion, and this forces the gas of combustion to rush toward the central part of the furnace, around the deflector 20 (but such expansion and penetration would necessarily occur even in the entire absence of the baffle 20); thence down through the bed 16 where this enormously high temperature of 4300° F. is maintained. In this portion of the furnace and at this temperature, in excess of 2% of nitric oxide is formed and the gas of combustion containing the nitric oxide now enters the top of the regenerative bed 17. As the gas passes down through the regenerative bed, it gives up its heat with extreme rapidity to the refractory fragments in the regenerative bed. The latter bed is substantially cooled because when the bed 17 was previously operated, that is on the preceding cycle, up-stream, it had also received a surplus of air (that is, had been overblown) and the excess of air over the requirements of combustion which had been withdrawn through the steam generators had reduced the temperature of the fragments at the top of this bed to about 3600° F. The products of combustion, including the nitric oxide, entering this zone at approximately 4300° F. are therefore cooled with enormous rapidity and comparatively little nitric oxide is decomposed.

If there had been no excess air blown through the furnace in the preceding cycle, then the temperature of the regenerative bed would be maintained at close to that of the reaction zone, namely, in excess of 4000° F. Under such circumstances with particles of the size usually employed in the regenerative beds of a large furnace, the rate of chilling would be relatively slow and the decomposition of nitric oxide into its elements, $N_2$ and $O_2$, in passing through the regenerative beds, relatively large. It should be understood that when nitric oxide is formed in gases of combustion at a high temperature approximating 4300° F. and the gas is then cooled slowly over a range of approximately 1000° F. or to about 3300° F., almost all of the nitric oxide will decompose into its elements. Enormous rapidity of chilling over this critical range amounting to perhaps more than a rate of 100,000° F. per second is depended upon to prevent decomposition. When cooled below the critical range the nitric oxide is fairly stable.

On the reversal cycle, it will be understood without detailed explanation that the operation of the blower will be reversed to blow through the conduits 35 instead of through the conduit 36, the burners nearest to the incoming air will be in operation and the burners further away will be out of operation and air will be withdrawn from the other of the two bustle pipes from that already referred to i. e. bustle 27 by way of flues 28. The time for reversal of the furnace is not fixed but may vary from 5 to 15 minutes.

The gas passing through the stack 39 is at a temperature approximating 600° F. and amounts to about 78,000 standard cubic feet per minute with an analysis of approximately $CO_2$ 4.11   $O_2$ 12.7   $N_2$ 81.29   NO 1.9

(By volume dry basis and contains about 8% water vapor)

The amount of fuel gas burned is about 4,280,000 standard cubic feet methane or equivalent natural gas, of which about 45% is accounted for by the hot air passing through the steam generator.

The general advantages of the present invention over that described in my previous application referred to is its very much greater simplicity and low cost with approximately the same capacity and efficiency, and at about the same savings of waste heat as are secured in the twin type of furnace described in the preceding application.

Although I have specified the withdrawal of a certain stated amount of air at an approximate mean temperature of 3400° F. through the steam generators, it will be understood that the use of steam generators is not essential to my invention but is, of course, very desirable for reasons of economy and because it results in making easy the operation of the control valves 33 and 34. It will also be understood that I may vary the amount of air withdrawn through the bustile pipes 25, 27 over a wide range which will result in a corresponding change in the rate of chilling of the combustion gas. Furthermore, although I have illustrated and described the withdrawal of the heated air during one half of the complete reversal cycle of the furnace, I may if desired vary this proportionate time of withdrawal at will. The essential accomplishment which I have here presented is the withdrawal of hot air from the regenerative beds under controlled conditions of time and volume so as to control the rate of chilling of the gas of combustion.

Other modes of applying the principle of my invention may be employed instead of the one explained, change being made as regards the means and the steps herein disclosed provided those stated by any of the following claims or their equivalent be employed.

I therefore particularly point out and distinctly claim as my invention:

1. A furnace for the making of nitric oxide from air, said furnace including a vertical furnace chamber; a plurality of beds sequentially arranged in said furnace chamber and consisting of an intermediate reaction bed of relatively large refractory bodies and adjacent terminal regenerative beds of substantially smaller refractory particles, conduits and valve means cooperative therewith for causing a gas containing nitrogen and oxygen in either direction to flow through said furnace chamber and through said beds, fuel gas inlet nozzles arranged in upper and lower tiers and disposed to supply fuel to the junction of the intermediate reaction bed and the beds on either side thereof at the respective junctions, and flues leading from said furnace chamber adjacent to the junctions of said intermediate reaction bed and two regenerative beds, said flues being operative alternately for the withdrawal of a portion of the preheated air passing through each of said regenerative beds toward the reaction zone.

2. A furnace for the making of nitric oxide from air, said furnace including a vertical furnace chamber; a plurality of beds sequentially arranged in said furnace chamber and consisting of an intermediate reaction bed of relatively large refractory bodies and adjacent terminal regenerative beds of substantially smaller refractory particles, conduits and valve means cooperative therewith for causing a gas containing nitrogen and oxygen in either direction to flow through said furnace chamber and through said beds, fuel gas inlet nozzles arranged in upper and lower tiers and disposed to supply fuel to the junction of the intermediate reaction bed and the beds on either side thereof at the respective junctions, and flues extending from the circumferential outer portion of said furnace chamber adjacent to the junctions of said intermediate reaction bed and said two regenerative beds, said flues being operative alternately for the withdrawal of a substantial portion of the preheated gas containing nitrogen and oxygen passing through each of said regenerative beds toward the reaction zone.

ROBERT D. PIKE.

REFERENCES CITED

The following references are of record in the file of this patent:

UNITED STATES PATENTS

| Number | Name | Date |
|---|---|---|
| Re. 19,757 | Royster | Nov. 12, 1935 |
| 777,485 | Pauling | Dec. 3, 1904 |
| 1,154,172 | Brownlee et al. | Sept. 21, 1915 |
| 1,464,845 | Downs et al. | Aug. 14, 1923 |
| 1,909,442 | Williams | May 16, 1933 |
| 2,006,078 | Pyzel | June 25, 1935 |
| 2,037,149 | Reiner | Apr. 14, 1936 |
| 2,121,733 | Cottrell | June 21, 1938 |
| 2,169,826 | Wendlandt | Aug. 15, 1939 |
| 2,272,108 | Bradley | Feb. 3, 1942 |
| 2,278,892 | Nagle et al. | Apr. 7, 1942 |
| 2,421,744 | Daniels et al. | June 10, 1947 |
| 2,422,081 | Cottrell | June 10, 1947 |